(12) United States Patent
Ohmae

(10) Patent No.: US 6,570,690 B1
(45) Date of Patent: May 27, 2003

(54) OPTICAL PARALLEL TRANSMISSION SYSTEM

(75) Inventor: Kenichi Ohmae, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,921

(22) Filed: May 25, 1999

(30) Foreign Application Priority Data

May 29, 1998 (JP) ............................................ 10/149526

(51) Int. Cl.[7] .............................................. H04B 10/00
(52) U.S. Cl. ...................... 359/158; 359/173; 375/354; 375/368
(58) Field of Search ................................ 359/158, 173; 375/354, 368

(56) References Cited

U.S. PATENT DOCUMENTS 6,201,829 B1 * 3/2001 Schneider .................. 375/221

FOREIGN PATENT DOCUMENTS

| JP | 51-110206 | 9/1976 |
|----|-----------|--------|
| JP | 5-227243 | 9/1993 |
| JP | 6-140992 | 5/1994 |
| JP | 8-37462 | 2/1996 |
| JP | 9-261174 | 10/1997 |

* cited by examiner

*Primary Examiner*—Kinfe-Michael Negash
(74) *Attorney, Agent, or Firm*—Sughrue, Mion, PLLC

(57) ABSTRACT

The present invention provides an optical parallel transmission system which can achieve reduction of the processing time without adding many processing functions. A pattern data adder adds, to transmission data, pattern data determined from the transmission data so that the transmission data per one bit becomes data having a form close to a repetition of "1", "0", and optical parallel transmission by AC coupling is realized thereby.

24 Claims, 4 Drawing Sheets

A : TRANSMISSION DATA
B : ADDED DATA

```
 A    B
00   10
01   10   ⎫
10   10   ⎬  "10" added always
11   10   ⎭
```

```
 A    B
00   11   ⎫
01   01   ⎬  Discriminated based on preceding data
10   10   ⎬
11   00   ⎭
```

OPTICAL PARALLEL TRANSMISSION SYSTEM

BACKGROUND OF THE INVENTION

1. Field of the Invention

This invention relates to an optical transmission system, and more particularly to an optical parallel transmission system which converts data of a plurality of bits into an optical signal to transmit the same parallelly.

2. Description of the Related Art

Conventionally, in optical transmission, serial transmission is usually employed so that no skew may occur between bits in long distance transmission, and is used in various fields relating to communications. Since AC coupling which involves determination of presence or absence of data from a variation of data is used in serial transmission, data of successive "0"s cannot be handled. Therefore, in serial transmission, data are transmitted after they are converted into different data having a form close to a repetition of "1" and "0". For this conversion, coding called 8 B/10 B conversion which converts 8-bit data into 10-bit data is used very frequently.

FIG. 1 is a diagrammatic view showing a conventional serial optical transmission system.

On the transmission side, 8-bit data to be transmitted are first converted into 10-bit data.

Then, the transmission data converted into 10-bit data are converted into serial data.

Thereafter, the transmission data converted into serial data are converted into an optical signal and transmitted over an optical fiber.

On the reception side, when the optical signal transmitted from the transmission side is received over the optical fiber, the received optical signal is first converted into an electric signal.

Then, a clock signal is extracted from the data converted into an electric signal and is converted into parallel data of 10 bits.

Thereafter, the 10-bit data converted into parallel data are converted into 8-bit data.

Serial optical transmission of data is realized by the sequence of processes described above.

However, when a large amount of data is transmitted, such serial transmission as described above increases the transmission amount per transmission line to such a level that transmission of the data cannot be realized. Particularly, transmission between clusters of computers is likely to suffer from the problem described above because a very large amount of data is transmitted.

Further, when serial transmission is carried out, parallel data must be converted into serial data, and this gives rise to another problem that a long processing time is required.

As a countermeasure for solving such problems as described above, realization of optical parallel transmission is demanded, and optical parallel transmission is being put into practical use to a certain extent.

FIG. 2 is a diagrammatic view illustrating a data transmission method in a conventional optical parallel transmission system.

On the transmission side, data of 8 bits to be transmitted and a clock signal are converted into an optical signal and transmitted over nine optical fibers provided in parallel.

On the reception side, when the optical signal transmitted from the transmission side is received over the optical fibers, the received optical signal is first converted into an electric signal.

Thereafter, skew adjustment is performed between the 8-bit data converted into the electric signal.

In such a conventional optical parallel transmission system as described above, when parallel data are transmitted as they are, it is often the case that data which include successive data of "0" cannot be transmitted in an AC fashion, and DC coupling by which a signal of successive "0"s or "1"s can be transmitted is demanded.

However, when it is tried to realize DC coupling, the module becomes expensive and is not practical. Besides, since various restrictions are applied, parallel transmission cannot be made taken advantage of.

Further, since parallel transmission of data produces a skew between data which is a difference in transmission time between transmission lines, there is a problem that a function of adjusting the skew must be newly added.

Furthermore, the optical parallel transmission system has many problems in regard to manufacture of parallel optical modules such as a yield and further has many problems also in regard to implementation of the same. However, in recent years, devices with which augmentation in yield can be achieved such as surface emitting lasers have exhibited remarkable augmentation in performance, and expectation for optical parallel transmission is increasing also due to perfection of modules.

SUMMARY OF THE INVENTION

It is an object of the present invention to provide an optical parallel transmission system which can achieve reduction of the processing time without adding many processing functions.

In the present invention, pattern data addition means adds, to transmission data, pattern data determined from the transmission data so that the transmission data per one bit becomes data having a form close to a repetition of "1", "0". Consequently, optical parallel transmission by AC coupling can be realized.

Further, since the pattern data addition means adds, to one or more positions of the transmission data, information for detecting synchronism among bits can be detected by synchronization processing means, so that there is no necessity of newly providing a function for adjusting a skew between bits of the transmission data.

Further, since it is discriminated by data discrimination means whether the transmission data is data which includes "1" and "0" or successive "0" data and a control signal for controlling processing on the reception side is produced based on the result of this discrimination and outputted, data transmission is performed smoothly.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

First Embodiment

Figure 1:
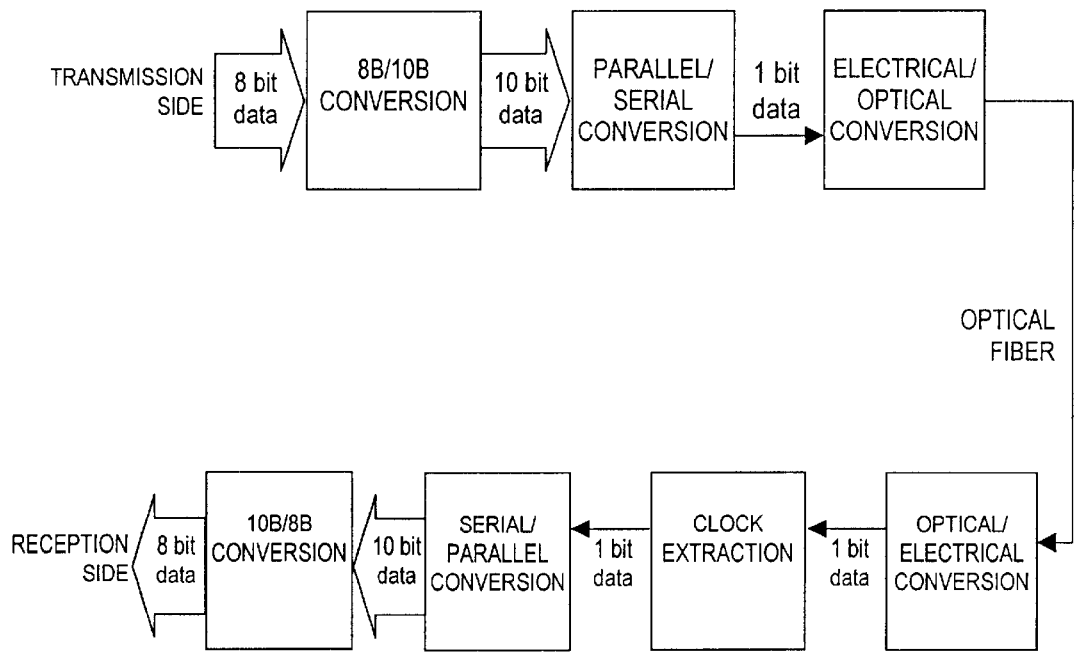
FIG. 1 is a diagrammatic view showing a conventional serial optical transmission system.
Figure 2:
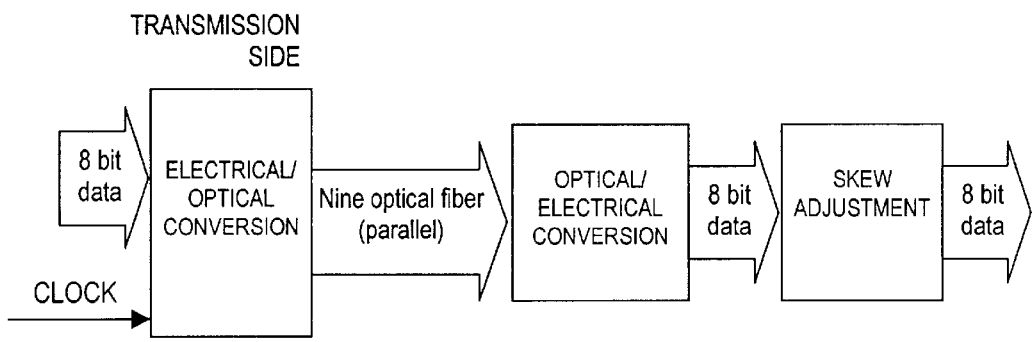
FIG. 2 is a diagrammatic view illustrating a data transmission method in an optical parallel transmission system.
Figure 3:
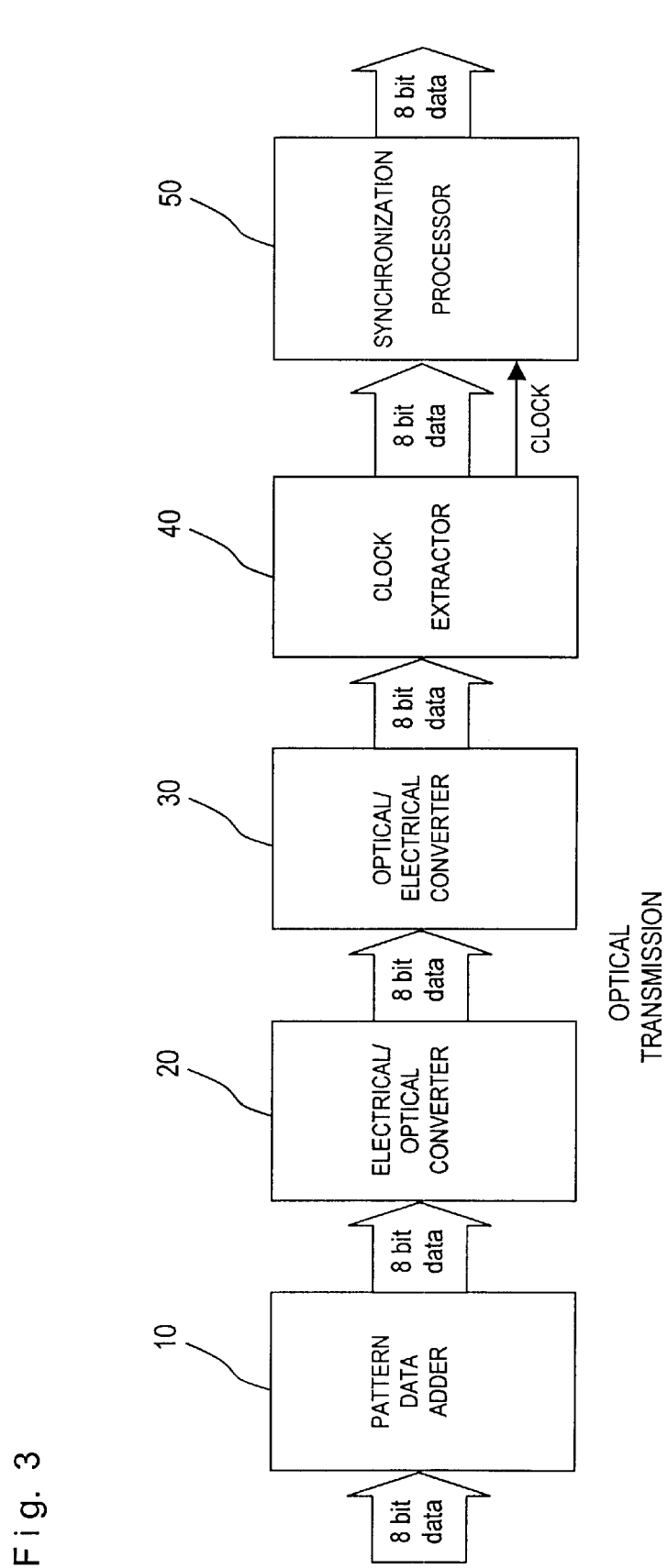
FIG. 3 is a diagrammatic view showing a first embodiment of an optical parallel transmission system of the present invention.

The present embodiment includes, as shown in FIG. 3, pattern data adder 10 for adding to transmission data of 8 bits pattern data determined from the transmission data and information for detecting synchronism between the bits, electrical/optical converter 20 which serves as first conversion means for converting the transmission data to which the pattern data and the information have been added by pattern data adder 10 into an optical signal of 8 bits and transmitting the optical signal of 8 bits, optical/electrical converter 30 which serves as second conversion means for converting the optical signal transmitted thereto into an electric signal, clock extractor 40 for extracting a clock signal from the data converted into an electric signal by optical/electrical converter 30, and synchronization processor 50 for synchronizing the data from which the clock signal has been extracted by clock extractor 40 based on the information added by pattern data adder 10.

In the following, a data transmission method of the optical parallel transmission system having the construction described above will be described.

Figures 4A, 4B:
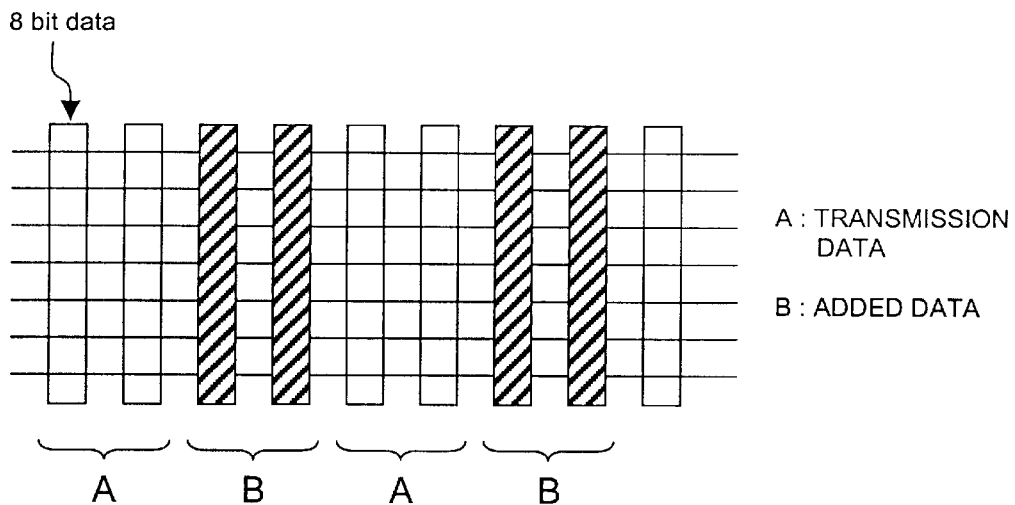
FIG. 4a is a diagrammatic view illustrating data to which pattern data are added in the optical parallel transmission system shown in FIG. 3.
FIG. 4b is a view illustrating motion per one bit in the optical parallel transmission system shown in FIG. 3.

When data of 8 bits is to be transmitted, pattern data adder 10 first adds pattern data as shown in FIG. 4a. Here, the pattern data added to the transmission data is determined based on preceding transmission data so that, as a result of addition of the pattern data, transmission data per bit (transmitted by one optical fiber) may infinitely approach a repetition of "1", "0". In the present embodiment, as shown in FIG. 4b, to transmission data of "0", "0", pattern data of "1", "1" is added; to transmission data of "0", "1", pattern data "0", "1" is added; to transmission data of "1", "0", pattern data of "1", "0" is added; and to transmission data of "1", "1", pattern data of "0", "0" is added.

This allows transmission by AC coupling.

However, as described above, if transmission data is transmitted with pattern data added thereto, then the data amount increases to twice in the time base direction. However, in the present condition of the optical transmission technology and the LSI technology, the foregoing is a reasonable construction. For example, in parallel transmission of 400 Mbit/second, while the optical part is required to have the performance of 800 Mbit/second, a rate of this order can be realized without any trouble by the present technology. Further, it is possible to realize electric transmission of the order of 400 Mbit/sec although there is some difficulty with regard to mounting.

On the other hand, if it is tried to realize this rate by serial transmission, a performance of 4 Gbit/sec is required, and very high technology is required and the cost is very high.

Figure 5:
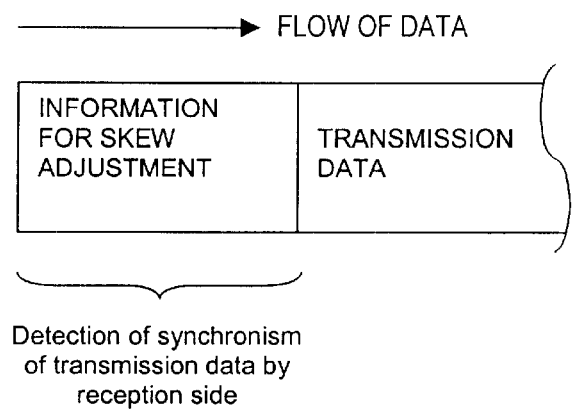
FIG. 5 is a diagrammatic view illustrating information added for detecting synchronism among bits by a pattern data adder shown in FIG. 3.

Further, information for detecting synchronism between the bits is added as shown in FIG. 5 by pattern data adder 10.

More particularly, information that can make variation between "0" and "1" definite such as 00001111 is added to the position at the top of the transmission data. This information is composed of a unit of approximately 4 to 6 bits at the maximum. If the information is composed of more than that unit, it may be impossible for the reception side to detect normal data because an excessively large number of data of "0" or "1" successively appear. Meanwhile, if processing is performed bit by bit, fine control can be achieved and a repetition of "1", "0" can be realized infinitely. In this instance, however, high speed processing is required and high LSI technology is required. Therefore, an optimum technique must be selected with the foregoing taken into consideration.

The transmission data to which the pattern data and the information have been added by pattern data adder 10 is converted into an optical signal of 8 bits by electrical/optical converter 20 and transmitted over the optical fibers.

When the signal transmitted over the optical fibers is received, the optical signal is first converted into an electric signal by optical/electrical converter 30.

Then, clock extractor 40 extracts a clock signal from the data converted into an electric signal by optical/electrical converter 30. Since the transmission data exhibits at any successive bits thereof a combination proximate to a repetition of "1", "0", it consequently allows clock extraction from any bit by clock extractor 40, so that there is no need of performing clock extraction for each bit.

Thereafter, synchronization processing of the data from which the clock signal has been extracted by clock extractor 40 is performed by synchronization processor 50 based on the information added to the transmission data by pattern data adder 10.

It is to be noted that a cause of a skew appearing between bits originates in the optical cable serving as a transmission line and driving and driven LSIs and optical parts, and since a skew detected once is varied little by conditions of use such as temperature, once detection of a skew is established, use can be continued by changing the mode to the usual data transmission mode. However, since some variation may possibly occur in use over a long period of time, the skew can be maintained if the information is added after each fixed interval of time.

Second Embodiment

In parallel transmission of data, transmission data is not always generated, and frequently no data is generated. When no data is present, "0" as blank data is always generated and transmitted so that data transmission can be performed immediately when transmission data is generated. However, since data of "0" appears repetitively when no data is present, this is very undesirable for data transmission. Therefore, in the present embodiment, information in a state when no data is present is transmitted with a control signal.

Figure 6:
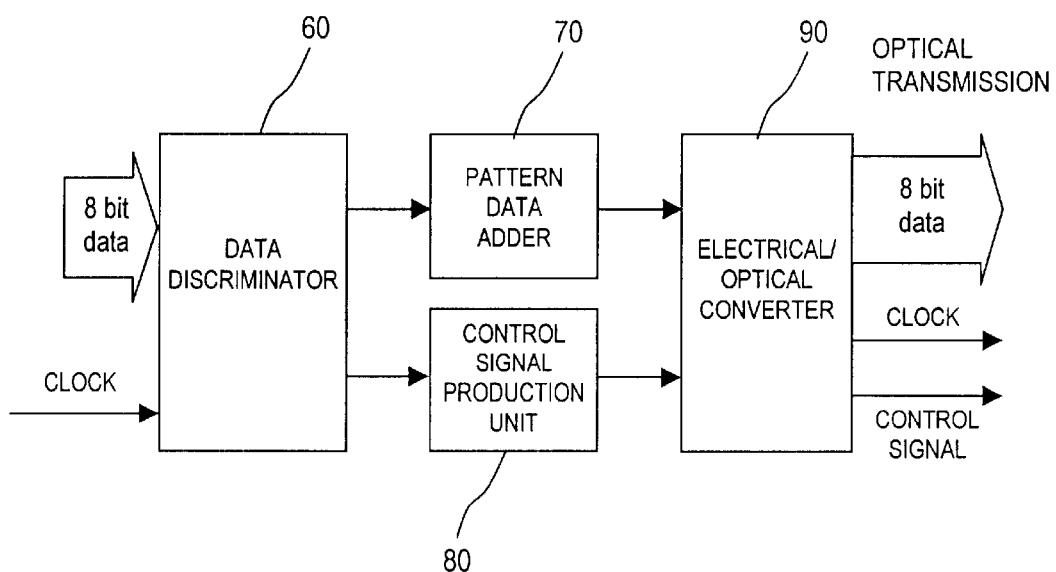
FIG. 6 is a block diagram showing a construction of the transmission side in a second embodiment of the optical parallel transmission system of the present invention.

The transmission side in the present embodiment includes, as shown in FIG. 6, data discriminator 60 which receives data of 8 bits to be transmitted and a clock signal as inputs thereto and discriminates the data of 8 bits to be transmitted, pattern data adder 70 for adding pattern data determined in advance to the data of 8 bits to be transmitted, control signal production unit 80 for producing a control signal based on a result of the discrimination of data discriminator 60, and electrical/optical converter 90 for converting the data to which the pattern data has been added by pattern data adder 70 and the control signal produced by control signal production unit 80 into an optical signal.

Next, a data transmission method in the optical parallel transmission system having the construction described above will be described.

First, it is discriminated by data discriminator 60 whether data to be transmitted is data including "1" and "0" or data of successive "0"s.

If successive "0" data are detected by data discriminator 60, control signal production unit 80 produces and outputs a control signal representing that the data is a repetition of "0" data.

On the other hand, if it is discriminated by data discriminator 60 that the data to be transmitted is data including "1" and "0", then control signal production unit 80 produces and outputs a control signal representing that the data is data including "1" and "0".

Further, pattern data is added by pattern data adder 70, and consequently, the transmission data becomes repetitive data of "1", "0". The resulting transmission data is converted into an optical signal by electrical/optical converter 90 and transmitted over optical fibers.

On the reception side, if a control signal that the data is successive "0" data is received, then it is discriminated that the data transmitted is "0"s, and "0" data is outputted successively.

On the other hand, if the reception side receives a control signal representing that the data includes "1" and "0", then it outputs the data transmitted.

It is to be noted that, since also the control signal produced by control signal production unit 80 is an optical signal, it is not preferable that the signal has a fixed value, and the two kinds of control signals can be distinguished from each other if, for example, a control signal of "100100 . . . " is produced for "0" data, but another control signal of "101010 . . . " is produced for data including "1" and "0".

In transmission of general data, the second embodiment operates similarly to the first embodiment described above.

Further, since an independent control signal is used, also a cable for transmission of a clock signal is added, and the necessity for a circuit to extract a clock signal on the reception side is eliminated, Although a certain preferred embodiment of the present invention has been shown and described in detail, it should be understood that various changes and modifications may be made therein without departing from the scope of the appended claims.

What is claimed is:

1. An optical parallel transmission system for transmitting transmission data comprising:
   optical signal transmission means and optical signal receiving means;
   said transmission means and receiving means connected by an optical fiber;
   said transmission means transmitting data in the form of an optical signal via the optical fiber to the receiving means;
   pattern data addition means for adding pattern data and information, for detection of synchronism between bits, to original data that will be transmitted by the transmission means to the receiving means, wherein said pattern data is determined from said original data and is added to the original data to make transmission data; and
   synchronization processing means for performing synchronization processing of the transmission data received by the receiving means, based on the information, for detection of synchronism between bits, added by said pattern data addition means.

2. An optical parallel transmission system according to claim 1, wherein said pattern data addition means adds pattern data to the transmission data, resulting in transmission data per bit having a repetition of a predetermined number of "1"s and a predetermined number of "0"s.

3. An optical parallel transmission system according to claim 2, wherein said pattern data addition means adds the information, for detection of synchronism between bits, to one or more positions of the transmission data.

4. An optical parallel transmission system according to claim 1, further comprising:
   first conversion means for converting the transmission data into an optical signal; and
   second conversion means for converting data, in the form of an optical signal transmitted thereto, into an electric signal.

5. An optical parallel transmission system according to claim 2, further comprising:
   first conversion means for converting the transmission data into an optical signal; and
   second conversion means for converting data, in the form of an optical signal transmitted thereto, into an electric signal.

6. An optical parallel transmission system according to claim 3, further comprising:
   first conversion means for converting the transmission data into an optical signal; and
   second conversion means for converting data, in the form of an optical signal transmitted thereto, into an electric signal.

7. An optical parallel transmission system according to claim 1, further comprising clock extraction means for extracting a clock signal from a data transmitted thereto.

8. An optical parallel transmission system according to claim 2, further comprising clock extraction means for extracting a clock signal from a data transmitted thereto.

9. An optical parallel transmission system according to claim 3, further comprising clock extraction means for extracting a clock signal from a data transmitted thereto.

10. An optical parallel transmission system according to claim 4, further comprising clock extraction means for extracting a clock signal from a data transmitted thereto.

11. An optical parallel transmission system according to claim 5, further comprising clock extraction means for extracting a clock signal from a data transmit ted thereto.

12. An optical parallel transmission system according to claim 6, further comprising clock extraction means for extracting a clock signal from a data transmitted thereto.

13. An optical parallel transmission system according to claim 1, further comprising:
   data discrimination means for discriminating whether the transmission data is data including "1" and "0" or successive "0" data; and
   control signal production means for producing and outputting a control signal for controlling processing on a reception side based on a result of the discrimination by said data discrimination means.

14. An optical parallel transmission system according to claim 2, further comprising:
   data discrimination means for discriminating whether the transmission data is data including "1" and "0" or successive "0" data; and
   control signal production means for producing and outputting a control signal for controlling processing on a reception side based on a result of the discrimination by said data discrimination means.

15. An optical parallel transmission system according to claim 3, further comprising:
   data discrimination means for discriminating whether the transmission data is data including "1" and "0" or successive "0" data; and control signal production means for producing and outputting a control signal for controlling processing on a reception side based on a result of the discrimination by said data discrimination means.

16. An optical parallel transmission system according to claim 4, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

17. An optical parallel transmission system according to claim 5, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

18. An optical parallel transmission system according to claim 6, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

19. An optical parallel transmission system according to claim 7, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

20. An optical parallel transmission system according to claim 8, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

21. An optical parallel transmission system according to claim 9, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

22. An optical parallel transmission system according to claim 10, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

23. An optical parallel transmission system according to claim 11, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

24. An optical parallel transmission system according to claim 12, further comprising:

data discrimination means for discriminating whether the transmission data is data including "1" and "0" or successive "0" data; and control signal production means for producing and outputting a control signal for controlling processing on a reception side based on a result of the discrimination by said data discrimination means.

* * * * *